United States Patent
Wetmore (10) Patent No.: US 9,014,732 B2
(45) Date of Patent: Apr. 21, 2015

(54) METHOD AND APPARATUS FOR SYNCHRONIZING MULTIPLE TRANSMITTERS

(75) Inventor: Robert E. Wetmore, Manhattan Beach, CA (US)

(73) Assignee: Fox Digital Enterprises, Inc., Los Angeles, CA (US)

( * ) Notice: Subject to any disclaimer, the term of this patent is extended or adjusted under 35 U.S.C. 154(b) by 489 days.

(21) Appl. No.: 12/947,604

(22) Filed: Nov. 16, 2010

(65) Prior Publication Data

US 2012/0122499 A1    May 17, 2012

(51) Int. Cl.
- *H04B 7/00* (2006.01)
- *H04B 7/06* (2006.01)
- *H04W 56/00* (2009.01)

(52) U.S. Cl.
CPC ............ *H04B 7/0671* (2013.01); *H04B 7/0673* (2013.01); *H04W 56/0015* (2013.01); *H04W 56/0035* (2013.01)

(58) Field of Classification Search
CPC .............................. H04H 20/67; H04J 3/0635
USPC .............. 455/500, 3.01, 3.02, 3.03, 502, 507; 348/194, 425.4, 521; 375/145, 149; 370/509
See application file for complete search history.

(56) References Cited

U.S. PATENT DOCUMENTS

| | | | |
|---|---|---|---|
| 4,409,684 A | 10/1983 | Pooch et al. | |
| 5,239,672 A | 8/1993 | Kurby et al. | |
| 5,729,825 A | 3/1998 | Kostreski et al. | |
| 7,103,374 B2 | 9/2006 | Yla-Jaaski et al. | |
| 7,110,048 B2 | 9/2006 | Weiss | |
| 7,336,646 B2 * | 2/2008 | Muller | 370/350 |
| 7,667,780 B2 | 2/2010 | Weiss | |
| 7,924,347 B2 | 4/2011 | Weiss | |
| 8,792,473 B2 * | 7/2014 | Bekiares et al. | 370/350 |
| 2007/0079224 A1 * | 4/2007 | Limberg | 714/792 |
| 2008/0112440 A1 * | 5/2008 | Bedekar et al. | 370/519 |
| 2009/0225910 A1 * | 9/2009 | Suzuki et al. | 375/343 |
| 2010/0166042 A1 * | 7/2010 | Iannuzzelli et al. | 375/145 |
| 2010/0195760 A1 * | 8/2010 | Weiss | 375/295 |

FOREIGN PATENT DOCUMENTS

| | | |
|---|---|---|
| EP | 0801502 | 10/1997 |
| EP | 1111935 | 6/2001 |
| WO | 9407314 | 3/1994 |
| WO | 0076113 | 12/2000 |

OTHER PUBLICATIONS

ATSC Standard for Transmitter Synchronization (Doc. A/110:2011, Apr. 8, 2011).
ATSC Digital Television Standard: Part 1—Digital Television System (Doc. A/53 Part 1:2009, Aug. 7, 2009).

(Continued)

*Primary Examiner* — Nay A Maung
*Assistant Examiner* — Angelica M Perez
(74) *Attorney, Agent, or Firm* — Gates & Cooper LLP (57) ABSTRACT

A method and apparatus for synchronizing multiple transmitters is disclosed. A global time reference is used to synchronize the arrival of data from a plurality of transmitters in a receiver station. In one embodiment, the global time reference is provided by a GPS satellite, and may also be used to synchronize the carriers of the signals received at the receiver station from each of the plurality of transmitters

33 Claims, 8 Drawing Sheets

(56) References Cited

OTHER PUBLICATIONS

ATSC Digital Television Standard: Part 2—RF/Transmission System Characteristics (Doc. A/53 Part 2:2007, Jan. 3, 2007).
ATSC Digital Television Standard: Part 3—Service Multiplex and Transport Subsystem Characteristics (Doc. A/53 Part 3:2009, Aug. 7, 2009).
ATSC Digital Television Standard: Part 4—MPEG-2 Video System Characteristics (Doc. A/53 Part 4:2009, Aug. 7, 2009).
ATSC Digital Television Standard: Part 5—AC-3 Audio System Characteristics (Doc. A/53 Part 5:2010, Jul. 6, 2010).
ATSC Digital Television Standard: Part 6—Enchanced AC-3 Audio System Characteristics (Doc. A/53 Part 6:2010, Jul. 6, 2010).
Enensys Technologies: "Technical Overview of Single Frequency Network". www.enensys.com.
Chaskar, H. M et al., "Statistical Multiplexing and QoS Provisioning for Real-Time Traffic on Wireless Downlinks", IEEE Journal on Selected Areas in Communications, vol. 19, No. 2, Feb. 2001, pp. 347-354.
Coffey, Gregory A., Video over ATM Networks, http://www.cis.ohio-state.edu/-jain/cis788-97/video_over_atm/index.htm Aug. 17, 1997.
DTV Report on COFDM and 8-VSB Performance, Office of Engineering and Technology Sep. 30, 1999, OET Report FCC/OET 99-2.
PCT International Search Report and Written Opinion dated Apr. 24, 2012, International Application No. PCT/US11/61073.

\* cited by examiner

METHOD AND APPARATUS FOR SYNCHRONIZING MULTIPLE TRANSMITTERS

BACKGROUND OF THE INVENTION

1. Field of the Invention

The present invention relates to systems and methods for wireless transmission, and in particular to a system and method for synchronizing transmissions from multiple transmitters.

2. Description of the Related Art

Terrestrial transmission systems have been used for many years to transmit television signals to television sets and other home based receivers. It is desirable for the range and scope of such television transmissions to be well controlled to assure that the television signals are receivable by the maximum number of appropriate viewers. At the same time, such transmissions must prevent interference with other television transmissions, and to prevent reception by inappropriate viewers.

One technique for extending the range of television transmissions is to use multiple transmitters, each disposed in a different location. In some cases, such transmitters are used to provide coverage in areas where a primary transmitter cannot reach. For example, in Los Angeles, many transmitters are placed on Mt. Wilson, where they have a line-of-sight to much of the Los Angeles Basin. However, even when optimally placed, such primary transmitters often cannot provide a strong enough signal to areas that are shadowed by natural features such as mountains, or interfered with by man-made features such as buildings and other transmitters. In such cases, service may nonetheless be provided by use of additional transmitters (known as gap fillers or boosters) disposed proximate the areas unserviced by the primary transmitter. Repeaters or range extenders may also be used to extend the reach of the primary transmitter beyond the typical line-of-sight reception range.

In addition to merely covering areas otherwise unserviced by the primary transmitter, an array of transmitters may be used to strengthen the received signal in some areas, while weakening the signal in others, by use of constructive and destructive interference principles.

One difficulty in the use of such auxiliary transmitters is that the signals that they transmit may interfere with the signals broadcast by the primary transmitter or other transmitter. These problems can be minimized by advantageous placement of the transmitters, by orienting the transmitter antennas in the optimal direction, and by choosing antenna patters such that coverage is maximized while interference is minimized. However, even using such techniques, the coverage area of the transmitters may overlap, raising the specter of interference in those areas.

Figure 1:
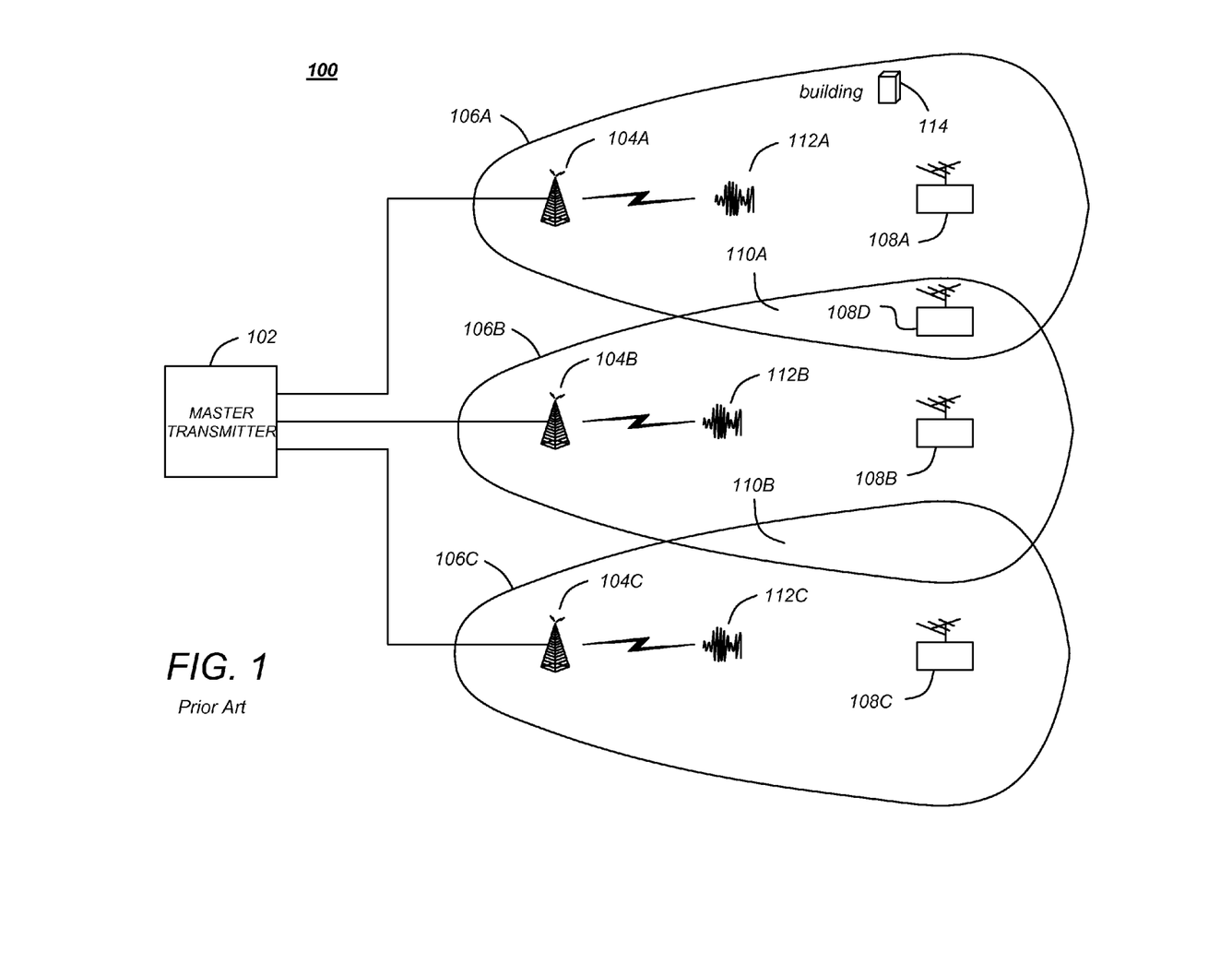
FIG. 1 is a diagram of a prior art transmission system.

FIG. 1 is a diagram of a prior art transmission system 100. The transmission system 100 includes a master transmitter 102 that is communicatively coupled a plurality of secondary transmitters 104A-104C (hereinafter alternatively referred to as transmitter(s) 104). The master transmitter 102 may be communicatively coupled with transmitters 104 via a wireless link (including radio frequency (RF), intermediate frequency (IF), microwave, optical frequencies) or a wired link. Wireless communications may be via terrestrial transmission, airborne transmission or by satellite. Further, communications with one of the transmitters 104 may be wireless, while communications with another one of the transmitters 104 may be wired.

The transmitters 106 receive a signal comprising information such as a media program, advertisements from the master transmitter 102 and retransmit the received signal to receiver stations 108A-108D (hereby alternatively referred to as receiver station(s) 108). Each of the transmitters 104 transmits provides a transmitted signal 112A-112C (hereinafter alternatively referred to as transmitted signal(s) 112) in coverage areas 106A-106C (hereinafter alternatively referred to as coverage area(s) 106).

The true coverage area of the transmitters 104 is not as simple as depicted. The actual coverage area will depend on time varying characteristics such as weather, the performance characteristics of the receiver stations 108, and external interference factors such as opaque objects 114 preventing signal passage or reflective objects that direct signals where they are not desired. For example, during periods of extreme weather, coverage areas 106 may be substantially reduced in size, and buildings may reflect signal to undesired areas. Further, a receiver station having improved hardware or software may be capable of receiving a signal from a transmitter in situations where a standard receiver station cannot. Coverage areas 106 include overlapping coverage areas 110A-110B (hereinafter alternatively referred to as overlapping coverage area(s) 110. Receiver stations 108 in overlapping areas (for example, receiver station 108D) may have difficulty receiving a signal because signal provided by transmitter 104A is interfered with by the signal from transmitter 104B. This problem is discussed in further detail in U.S. Pat. No. 7,110,048, issued Sep. 9, 2006 to Weiss, which is incorporated by reference herein.

While the '048 patent proposes a solution to the interference problem, it does not disclose a system that ensures that the data received from a first repeater is completely identical to data received from the main transmitter. If the data received from a first repeater is not identical to that received from the main transmitter regardless of the time delay, the non-identical data will cause mutual interference.

Additionally because the described processing adds potentially different time delays to each of the signals from each transmitter, the '048 patent makes no provision for assuring that the data transmitted by each transmitter is received within the ability of a receiver to equalize out the resultant intersymbol interference.

If the received data is not completely identical, it will seem to a receiver that picks-up both the main and the repeated signal simultaneously as both interference and as an echo. While some of the receivers can equalize out the effects of echoes, they cannot correct for interference. Further, at some point, the delays may be large enough to exceed the capacity of the equalizers to detect and cancel the echoes. Accordingly, the system disclosed in the '048 patent will result in transmissions that cannot be received due to interference or excessively long echoes.

Interference can be from many sources, including multipath and other problems that are caused by the signals 112A and 112B arriving at the receiver at different times. One problem is that the carrier of the first signal 112A will not be in phase with the carrier of the second signal 112B, compromising the demodulation of the signal at the receiver station 108. Another problem is that after demodulation, the data itself from the different transmitters 104 do not arrive at the receiver station 108 at the same time, thus causing reception difficulties.

Channel equalizers in the receiver stations 108 can ameliorate the echoed data to a certain extent, but at some point, the channel equalizers become ineffective, and the echoed data begins to compromise reception of the signal to the point where the data arriving later from other transmitters essentially becomes interference, and resulting data is unusable.

What is needed is a method and apparatus which synchronizes not only the carriers used in the transmission and reception of such data, but also, the data itself. The present invention satisfies that need.

SUMMARY OF THE INVENTION

To address the requirements described above, the present invention discloses a method and apparatus for synchronizing a first signal comprising data transmitted by a first transmitter at a first frequency and a second signal comprising the data transmitted by a second transmitter at the first frequency, the first signal and second signal transmitted to a receiver in a coverage area of the first transmitter and the second transmitter, wherein the data comprises synchronization information. In an illustrative embodiment, the method comprises the steps of receiving the data in the first transmitter, receiving the data in the second transmitter, generating a first time offset between the synchronization information of the data received in the first transmitter and a time reference common to the first transmitter and the second transmitter, generating a second time offset between the synchronization data received in the first transmitter and the time reference common to the first transmitter and the second transmitter, generating first delayed data from the data delayed by the first time offset, generating second delayed data from the data delayed by the second time offset, transmitting the first delayed data from the first transmitter and transmitting the second delayed data by the second transmitter.

In another embodiment, the apparatus comprises a first transmitter and a second transmitter, wherein the first transmitter comprises a first receiver for receiving the data, a first time synchronization module for generating a globally common time reference, a first time offset generator for generating a first time offset between the synchronization information of the data received in the first transmitter and the generated globally common time reference, a first delay module for generating first delayed data from the data delayed by the first time offset, and a first means for transmitting the first delayed data from the first transmitter, and the second transmitter comprises a second receiver for receiving the data, a second time synchronization module for generating the globally common time reference, a second time offset generator for generating a first time offset between the synchronization information of the data received in the first transmitter and the generated globally common time reference, a second delay module for generating second delayed data from the data delayed by the second time offset, and a second means for transmitting the second delayed data by the second transmitter.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 2:
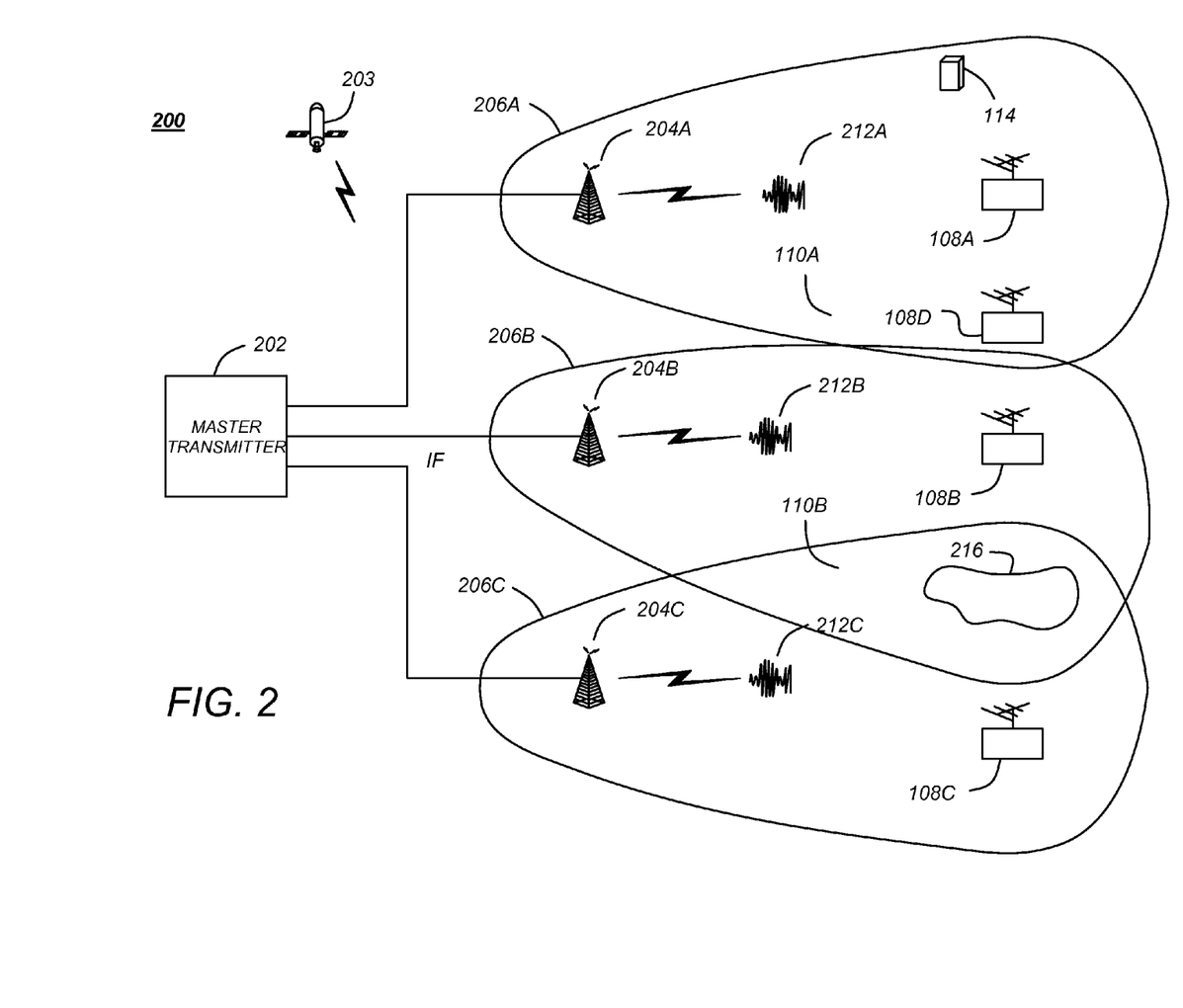
FIG. 2 is a diagram of an adaptive transmission system.

FIG. 2 is a diagram of an adaptive transmission system (ADS) 200. The ADS 200 includes a master transmitter 202 that is communicatively coupled a plurality of secondary transmitters 204A-204C (hereinafter alternatively referred to as transmitter(s) 204). The master transmitter 102 may be communicatively coupled with transmitters 204 via a wireless link (including radio frequency (RF), intermediate frequency (IF), microwave, optical frequencies) or a wired link. As was true with the transmission system depicted in FIG. 2, wireless communications may be via terrestrial transmission, airborne transmission or by satellite, and communications with one of the transmitters 204 may be wireless, while communications with another one of the transmitters 204 may be wired.

The transmitters 206 receive the signal from the master transmitter 202 and retransmit the received signal to receiver stations 108. Each of the transmitters 204 transmits provides a transmitted signal 212A-212C (hereinafter alternatively referred to as transmitted signal(s) 212) in coverage areas 206A-206C (hereinafter alternatively referred to as coverage area(s) 206). Note that the coverage area 206B related to transmitter 204B is shifted from the coverage area 106B illustrated in FIG. 1 so that there is less overlapping coverage between coverage area 206A and 206B than there is with coverage areas 106A and 106B and that overlapping coverage between coverage areas 206B and 206C include area 216, which may be an area where interference between the signals from transmitter 204B and 204 is permitted. For example, area 216 may represent a lake or a mountainous region with few or no receiver stations 108. Coverage areas 206A-206C are adjusted using by adjusting the phase of the carrier used to transmit signals 212A-212C and by delaying the data transmitted in signals 212A-212C via a global common time reference that is independent from the signals received in the transmitters 204. In one embodiment, this global common time reference is a signal received from a satellite 203. For example, the satellite 203 may be a global positioning system (GPS) satellite, and the global common time reference may be the clock that is included with the GPS signal.

Figure 3:
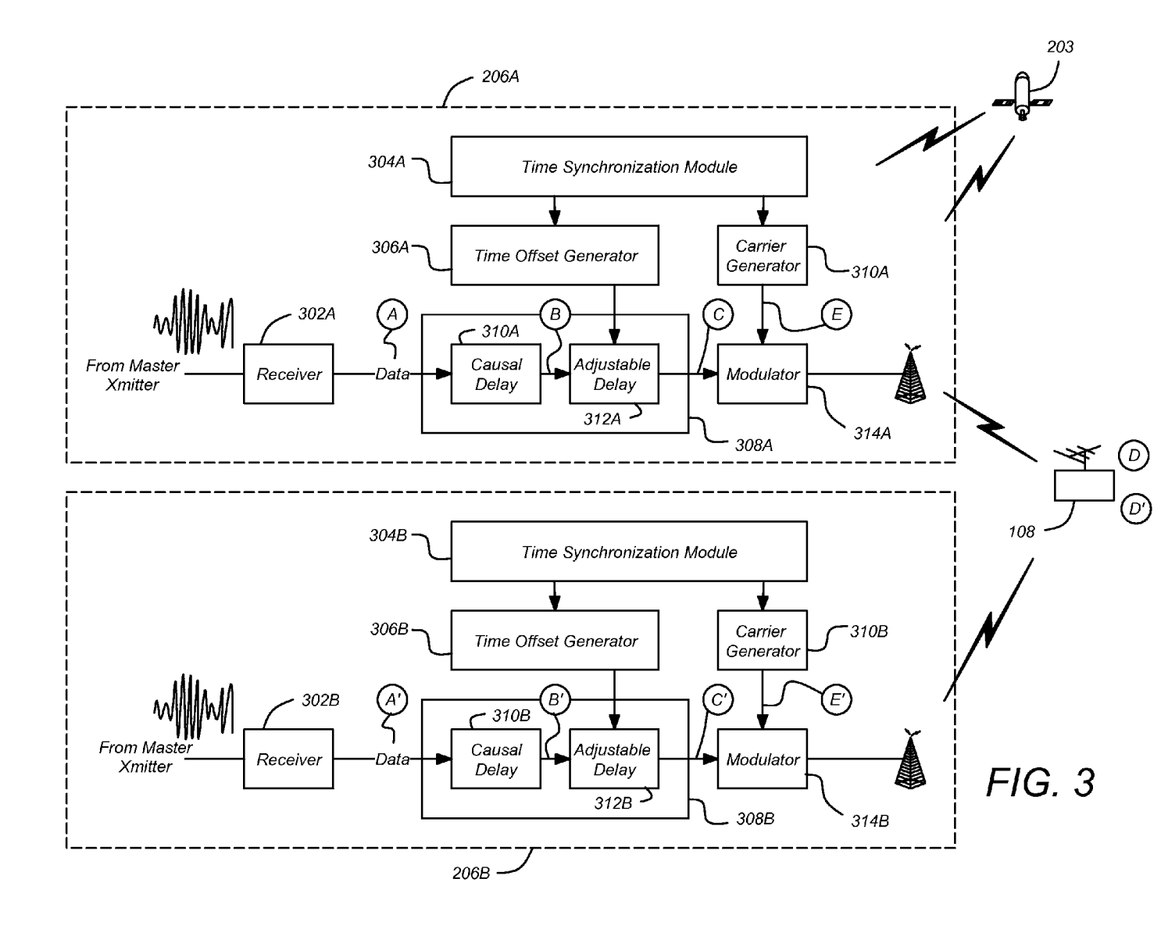
FIG. 3 is a diagram presenting one embodiment of the transmitters.

FIG. 3 is a diagram presenting one embodiment of the transmitters 206. A first transmitter (for example, transmitter 206A) comprises a receiver 302A for receiving a signal comprising the data transmitted from the master transmitter 202. The data includes synchronization information that is later used to synchronize the transmission from the transmitter 206 with that of other transmitters.

In one embodiment, the signal received by the receiver 302A is an ATSC-compliant signal, as described in "A/53: ATSC Digital Television Standard Parts 1-6, 2007, published 3 Jan. 2007 by the Advanced Television Systems Committee, Inc., which document is hereby incorporated by reference herein. Pages 10-11 of this reference describe that the signal data is organized to include Data Frames consisting of two Data Fields, each containing 313 Data Segments. The first Data Segment of each Data Field is a unique synchronizing signal known as a Data Field Synchronization signal. The Data Field Synchronization signal comprises a pattern of symbols having a constant value (e.g. '1001') among the data frames and is repeated at regular intervals (e.g. 24.3 ms), which comprises a training sequence that can be used by the equalizer in the receiving station 108. Each Data Segment consists of 832 symbols, the first 4 of which are transmitted in binary form and comprise a Data Segment Synchronization signal that provides segment synchronization. The Data Segment Synchronization signal comprises a pattern of symbols having a constant value (e.g. '1001') among the data frames, and is also repeated at regular (e.g. 77.3 µs) intervals. Either the Data Field Synchronization signal or the Data Segment Synchronization signal can represent the synchronization information of the data received by the receiver 302A.

The first transmitter 206A also comprises a time synchronization module 304A that generates a globally common time reference. In one embodiment, this comprises a time synchronization receiver that receives a globally common time reference from a signal received from an external source. For example, the time synchronization receiver may comprise a GPS receiver, and the globally common time reference may be the clock available in the received GPS signal.

The first transmitter 206A also comprises a time offset generator 306A that generates a first time offset between synchronization information in the data received by the receiver 302A and the received globally common time reference generated by the time synchronization module. The data and the time offset are provided to a first delay module 308A, which delays the data generated by the receiver according to the time offset generated by the time offset generator 306A. In one embodiment, this delay includes a causal delay provided by a causal delay element 310a and an adjustable delay provided by an adjustable delay element 312B. A causal system is known as one in which the output is a function of past and/or current inputs to the system, but not future inputs to the system. For example, a moving average filter may be defined as:

$$y_n = \frac{1}{2}x_{n-1} + \frac{1}{2}x_{n+1}.$$

Such a filter is non-causal because the output depends upon a future input $x_{n-1}$. Such a system may be rendered causal by delaying the output of the moving average filter thusly:

$$y_n = \frac{1}{2}x_{n-1} + \frac{1}{2}x_{n-2}$$

This delay may be provided by the causal delay element 310A, and may have a predetermined value that is sufficient to assure system causality under all circumstances. The value may also a constant value. The adjustable delay element 312 is used to provide a delay that synchronizes the data between the output of the first transmitter 206A and the other transmitters 206B-206C. This is further illustrated in the following discussion.

The first transmitter 206A may also include a carrier generator 310A that generates a carrier using the generated globally common time reference from the time synchronization module 304A in order to synchronize the carriers of the received signals from the first transmitter 206A and other transmitters 206B-206C. In this context, synchronization may in fact require that the carriers transmitted by each transmitter be out of phase by an amount required to assure that they are in phase when received.

The carriers and data are provided to a modulator 314A, which modulates the data. The modulated data is amplified and provided to an antenna for transmission to the receiver stations 108 as shown in FIG. 3.

Also illustrated in FIG. 3, are corresponding elements of a second transmitter 206B, which function and interrelationship with other second transmitter 206B elements are identical to those described above for the first transmitter 206A.

Figure 4:
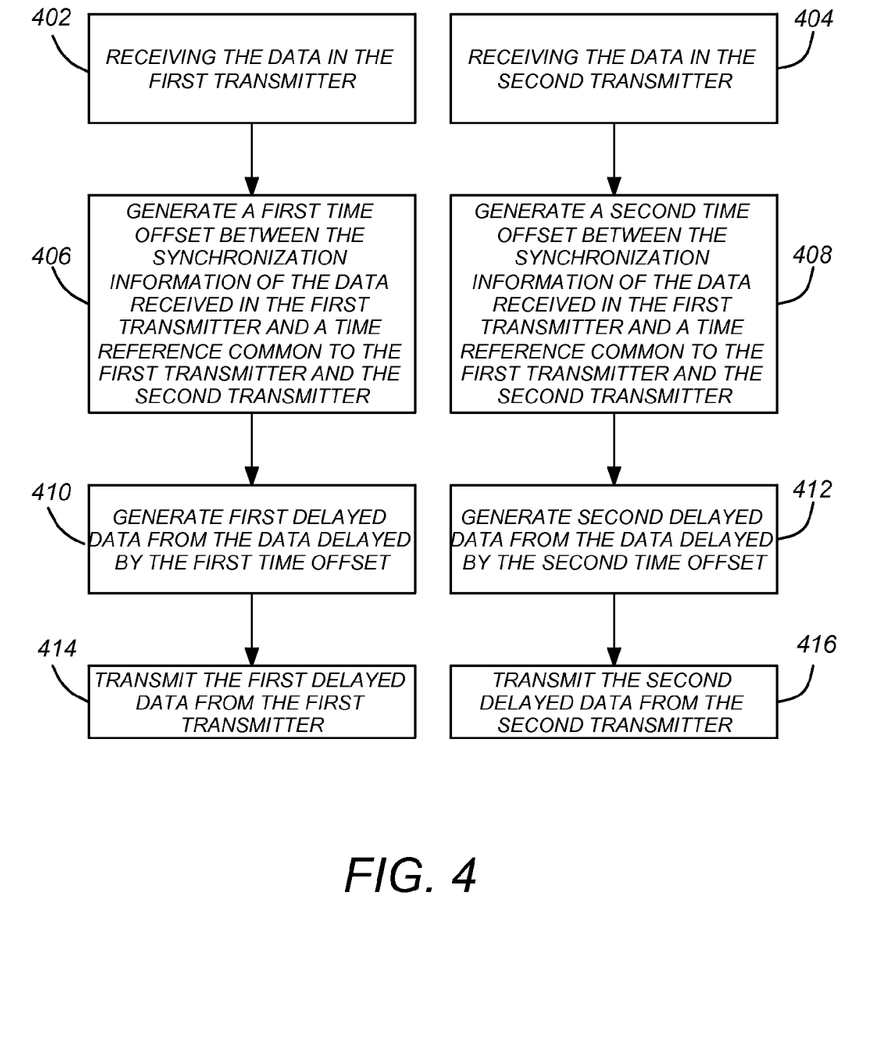
FIG. 4 is a diagram illustrating exemplary method steps that can be used to implement one embodiment of the present invention.

FIG. 4 is a diagram illustrating exemplary method steps that can be used to implement one embodiment of the present invention. In blocks 402 and 404, the data from the master transmitter is received in the first and second transmitters.

Figure 5A:
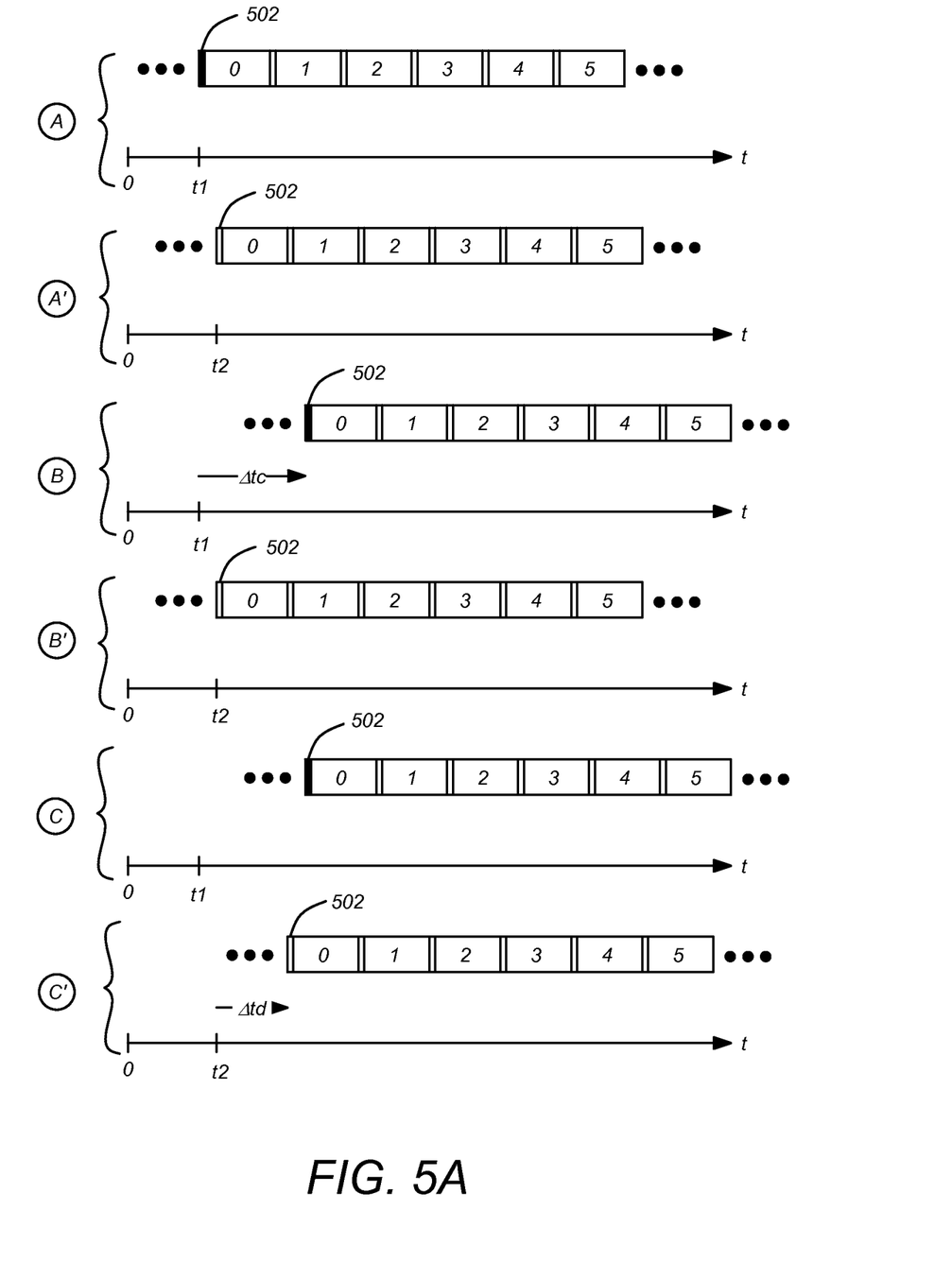
FIG. 5A is a diagram illustrating the temporal appearance of the data received and processed by the first transmitter and the second transmitter.

FIG. 5A is a diagram illustrating the temporal appearance of the data received and processed by the first transmitter 206A and the second transmitter 206B. The plot labeled "A" illustrates the data received by receiver 302A, and illustrates synchronization information 502. Plot A' illustrates the same data, with the same synchronization information 502, as received by receiver 302B. Note that the data produced by receiver 302A may not be produced simultaneously by receiver 302B. FIG. 5, for example, illustrates a case where the data produced by receiver 302B is delayed from that of receiver 302A by the time period $t_2-t_1$. This time difference can be due to a variety of factors, including multipath, or processing delays between the master transmitter 202 and the receivers 302A and 302B.

Returning to FIG. 4, a first time offset is generated between the synchronization information of the data received in the first transmitter 206A and a time reference common to the first transmitter 206A and the second transmitter 206B, as shown in block 406. In one embodiment, the time reference common to the first transmitter 206A and the second transmitter 206B is a clock signal received from a GPS satellite. Further, a second time offset is generated between the synchronization information of the data received in the second transmitter 206B an the time reference common to the first transmitter 206A and the second transmitter 206B, as shown in block 408. In block 410, the first received data is delayed by the first time offset, thus generating first delayed data. Similarly, in block 412, the second delayed data is delayed by the second time offset, thus generating second delayed data. Finally, as shown in blocks 414 and 416, the first delayed data is transmitted from the first transmitter 206A and the second delayed data is transmitted by the second transmitter 206B. In one embodiment, the first time offset and the second time offset are selected to maximize reception by the receiver station(s) 108 of interest in the coverage area of the first transmitter 206A and the second transmitter 206B. This, of course, may result in providing a stronger signal to some receiver stations 108 and a weaker signal to some other receiver stations 108.

The generation of the first and second time delays is further illustrated in FIG. 5. As described above, it is important for implemented systems to be causal and such causality can be assured by delaying one or more inputs to the system. Accordingly, the first transmitter 206A and/or the second transmitter 206B may implement a causal delay element 310A and/or 310B in order to delay the data received from the receiver 302A and/or 302B. In the embodiment illustrated in FIG. 5, the data received from the first receiver 302A is delayed an amount $\Delta t_c$ as shown in plot B. This allows the data from the second receiver 302B to be significantly delayed yet still remain a causal system. It is also possible to delay the data from the first receiver 302B to assure causality or to delay the data from both receivers to assure causality.

A computation is performed to determine the desired time difference between the signal transmitted by the first transmitter 206A and the second transmitter 206B in order to maximize or minimize certain transmission criteria. For example, a set of receiver stations 108 can be separated into a first group of receiver stations 108 that should receive the broadcast signal and a second group of receiver stations 108 that should not receive the broadcast signal. The time delay between the signal transmission from the first transmitter 306A and the second transmitter 306B can be adjusted to maximize the number of receiver stations 108 that can receive the broadcast signal and to minimize the number of receiver stations 108 that cannot receive the broadcast signal. Further, the delay can be adjusted so that multipath interference is brought to acceptable levels (levels that do not interfere with reception) for receiver stations that are intended to receive the broadcast signal. Such computations may be performed well in advance of the signal transmission, or may be performed in real time by measuring the signals received at different locations, and adjusting the delay in each of the transmission stations to maximize the reception of signals at the desired locations.

The desired time difference is determined for either or both of the transmitters 206A and 206B and implemented using either or both of the causal delay elements 310 and adjustable delay elements 312 of the transmitters 206. In the embodiment shown in FIG. 5, the desired time difference is implemented by adding a causal delay only to the data received by the first receiver 302A as shown in plot B and a delay $\Delta t_d$ to the data received by the second receiver 302B as shown in plot C'.

Figure 5B:
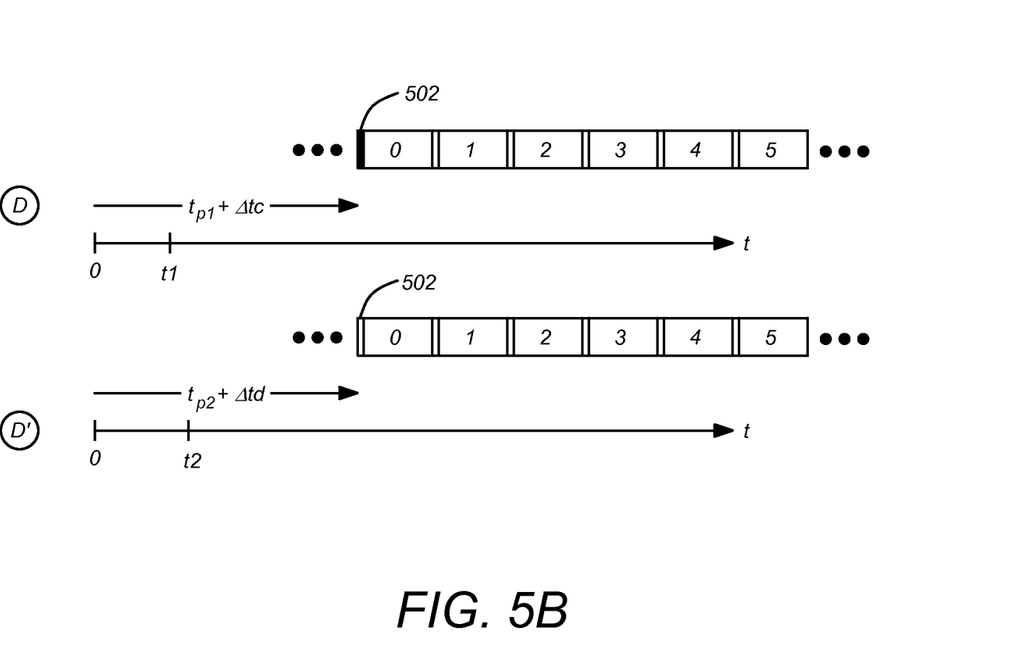
FIG. 5B is a diagram showing the signal received at the receiver station.

FIG. 5B is a diagram showing the signal received at the receiver station 108. Assuming the transmission from transmitter 206A takes time $t_{p1}$ to travel from transmitter 206A to the receiving station 108 and the transmission from transmitter 206B takes time $t_{p}2$ to travel from transmitter 206B to the receiving station 108, $\Delta t_d$ and $\Delta t_c$ are chosen so that the data embodied in the signal received at the receiving station 108 is received at substantially the same time, or at least times temporally close enough to permit the receiving station 108 to receive the signals. This may require, for example, that the signals be received by the receiving station 108 such that the a receiving station channel equalizer can account for and correct the time differences.

The global time reference can also be used to synchronize the carriers received by the receiving station from the first transmitter 206A and the second transmitter 206B. This can be accomplished by using the global time reference to generate the carrier as shown in FIG. 3, or by simply delaying one or more of the carriers.

Figure 6:
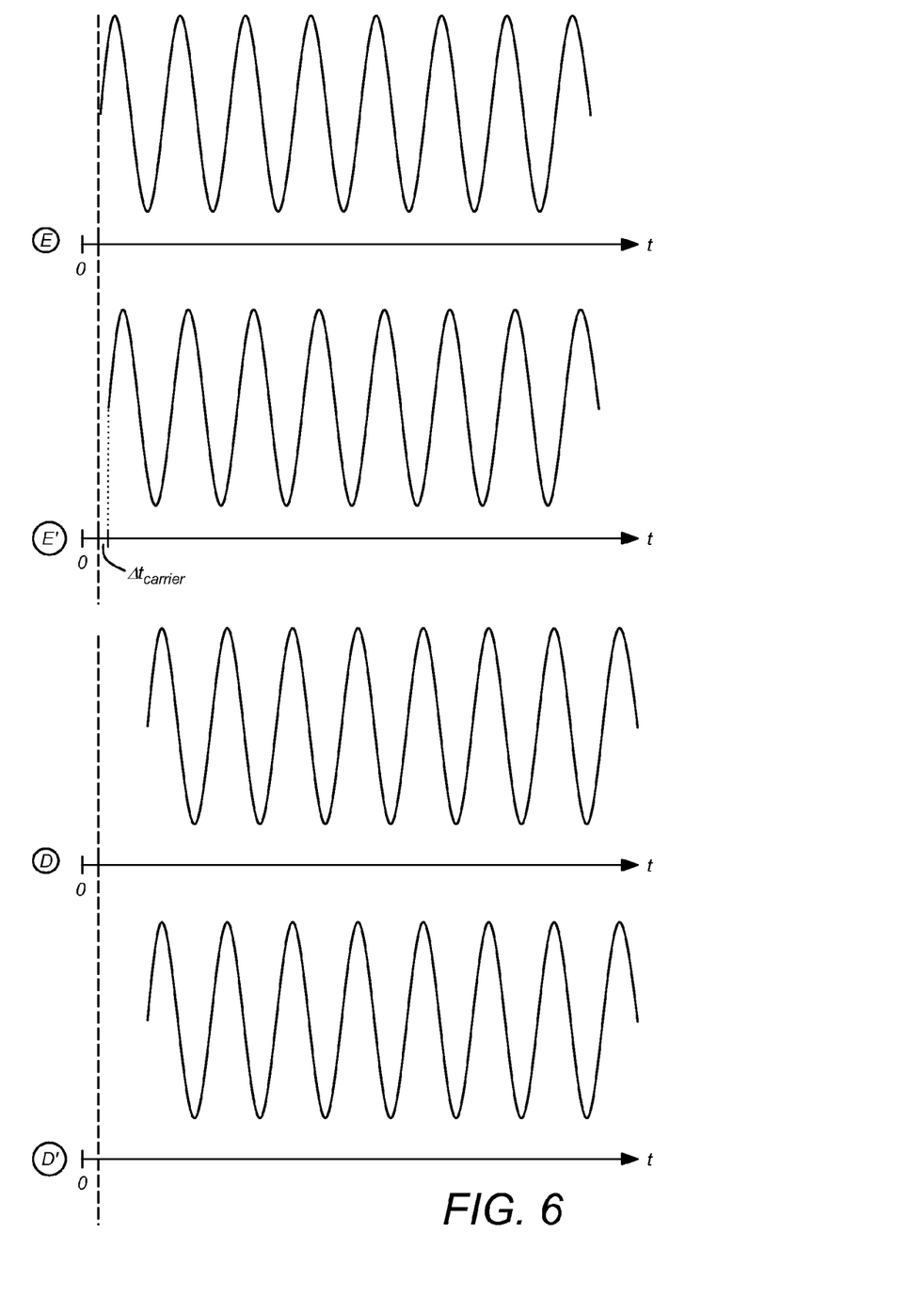
FIG. 6 is a diagram showing a temporal comparison of the carrier produced by the first carrier generator and the second carrier generator and received in the receiver station.

FIG. 6 is a diagram showing a temporal comparison of the carrier produced by the first carrier generator 310 and the second carrier generator 310B. In order to assure that the carriers of the signals received at the receiving station 108 from each transmitter are sufficiently in phase, the carrier from carrier generator 310A and/or carrier generator 310B may be delayed by $\Delta t_{carrier}$ so that the carriers arrive with the same or substantially the same phase.

Figure 7:
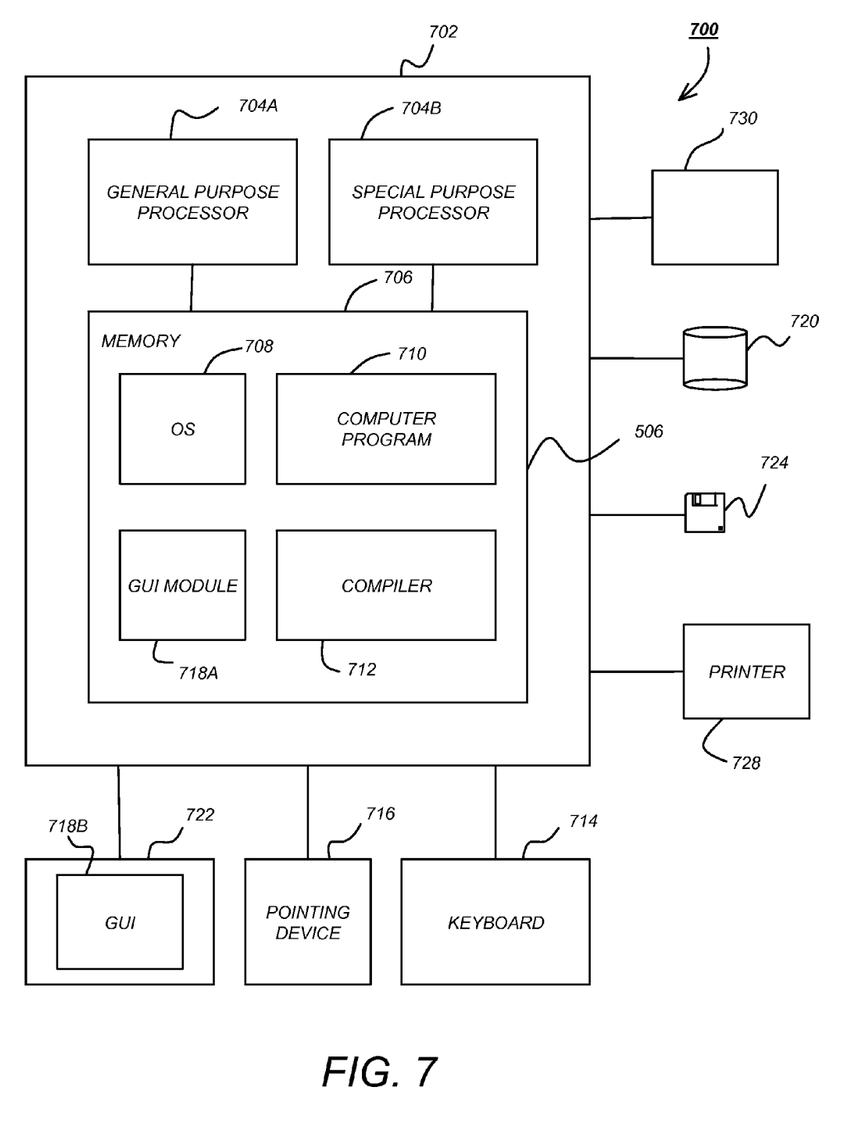
FIG. 7 is a diagram illustrating an exemplary computer system that could be used to implement elements of the present invention.

FIG. 7 is a diagram illustrating an exemplary computer system 700 that could be used to implement elements of the present invention, including the time offset generators 306 and the delay modules 308. A computer 702 comprises a general purpose hardware processor 704A and/or a special purpose hardware processor 704B (hereinafter alternatively collectively referred to as processor 704) and a memory 706, such as random access memory (RAM). The computer 702 may be coupled to other devices, including input/output (I/O) devices such as a keyboard 714, a mouse device 716 and a printer 728.

In one embodiment, the computer 702 operates by the general purpose processor 704A performing instructions defined by the computer program 710 under control of an operating system 708. The computer program 710 and/or the operating system 708 may be stored in the memory 706 and may interface with the user and/or other devices to accept input and commands and, based on such input and commands and the instructions defined by the computer program 710 and operating system 708 to provide output and results.

Output/results may be presented on the display 722 or provided to another device for presentation or further processing or action. In one embodiment, the display 722 comprises a liquid crystal display (LCD) having a plurality of separately addressable pixels formed by liquid crystals. Each pixel of the display 722 changes to an opaque or translucent state to form a part of the image on the display in response to the data or information generated by the processor 704 from the application of the instructions of the computer program 710 and/or operating system 708 to the input and commands. Other display 722 types also include picture elements that change state in order to create the image presented on the display 722. The image may be provided through a graphical user interface (GUI) module 718A. Although the GUI module 718A is depicted as a separate module, the instructions performing the GUI functions can be resident or distributed in the operating system 708, the computer program 710, or implemented with special purpose memory and processors.

Some or all of the operations performed by the computer 702 according to the computer program 710 instructions may be implemented in a special purpose processor 704B. In this embodiment, some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 702 may also implement a compiler 712 which allows an application program 710 written in a programming language such as COBOL, C++, FORTRAN, or other language to be translated into processor 704 readable code. After completion, the application or computer program 710 accesses and manipulates data accepted from I/O devices and stored in the memory 706 of the computer 702 using the relationships and logic that was generated using the compiler 712.

The computer 702 also optionally comprises an external communication device such as a modem, satellite link, Ethernet card, or other device for accepting input from and providing output to other computers.

In one embodiment, instructions implementing the operating system 708, the computer program 710, and/or the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, or a flash drive. Further, the operating system 708 and the computer program 710 are comprised of computer program instructions which, when accessed, read and executed by the computer 702, causes the computer 702 to perform the steps necessary to implement and/or use the present invention or to load the program of instructions into a memory, thus creating a special purpose data structure causing the computer to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 702.

Although the term "computer" is referred to herein, it is understood that the computer may include portable devices such as cellphones, portable MP3 players, video game consoles, notebook computers, pocket computers, or any other device with suitable processing, communication, and input/output capability.

While in the foregoing example, delays were implemented in the remote transmitters 206, embodiments are possible in which the master transmitter 202 adds the appropriate delays to each signal transmitted to the remote transmitters 204. However, this embodiment is less desirable, as time delays in the master transmitter 202 to remote transmitter 204 communication path are more difficult to account for. It is also noted that although the foregoing uses a GPS satellite for the global time reference, other time references can be used, so long as they are of sufficient accuracy and available at the transmitters 204C.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of synchronizing a first signal comprising data transmitted by a first transmitter and a second signal comprising the data transmitted by a second transmitter remote from the first transmitter, the first signal and second signal transmitted to a receiver in a coverage area of the first transmitter and the second transmitter, wherein the data comprises a plurality of data frames, each of the plurality of data frames having synchronization information having a constant value among the data frames, comprising the steps of:
   receiving the data in the first transmitter from a master transmitter;
   receiving the data in the second transmitter from the master transmitter;
   generating a first time offset between the synchronization information of the data received in the first transmitter and a global time reference common to the first transmitter and the second transmitter and independent from the data received by the first transmitter;
   generating a second time offset between the synchronization information received in the second transmitter and the global time reference common to the first transmitter and the second transmitter and independent from the data received by the second transmitter;
   generating first delayed data from the data received in the first transmitter delayed by the first time offset;
   generating second delayed data from the data received in the second transmitter delayed by the second time offset;
   transmitting the first signal having the first delayed data from the first transmitter, comprising modulating the first delayed data with a first carrier at a first frequency; and
   transmitting the second signal having the second delayed data by the second transmitter, comprising modulating the second delayed data with a second carrier at the first frequency;
   wherein the first carrier and the second carrier are synchronized to be in phase according to the global time reference.

2. The method of claim 1, wherein at least one of the first time offset and the second time offset includes a causal delay.

3. The method of claim 1, wherein the first time offset and the second time offset are predetermined.

4. The method of claim 1, wherein the receiver is one of a plurality of receivers in the coverage area of the first transmitter and the second transmitter and the first time offset and the second time offset are selected to maximize a number of the plurality of receivers in the coverage area that can receive the data.

5. The method of claim 1, wherein the time reference is independent from a master transmitter transmitting the data to the first transmitter and the second transmitter.

6. The method of claim 1, wherein the time reference is comprised in a signal from a global positioning system (GPS) satellite.

7. The method of claim 1, wherein the first signal and the second signal are vestigial advanced television systems committee (ATSC) compliant signals, and the synchronization information comprises a data segment synchronization signal.

8. The method of claim 1, wherein synchronization information comprises a plurality of identical symbols inserted every N symbols.

9. The method of claim 1, wherein the synchronizing information is selected from a data segment synchronization signal and a data field synchronization signal of an ATSC-compliant signal.

10. The method of claim 1, wherein the first delayed data is modulated with only one carrier and the second delayed data is modulated with only one carrier.

11. An apparatus for synchronizing the transmission of data comprising a plurality of data frames, each of the plurality of data frames having synchronization information having a constant value among the data frames, the apparatus comprising:
- a first transmitter, comprising:
  - a first receiver for receiving the data from a master transmitter;
  - a first time synchronization module for generating a globally common time reference independently from the data received by the first transmitter;
  - a first time offset generator for generating a first time offset between the synchronization information of the data received in the first transmitter and the generated globally common time reference;
  - a first delay module for generating first delayed data from the data received in the first transmitter and delayed by the first time offset;
  - a first carrier generator for generating a first carrier according to the generated globally common time reference;
  - a first modulator for modulating the first delayed data with the first carrier at the first frequency to produce a first signal; and
  - a first means for transmitting the first signal having the first delayed data from the first transmitter;
- a second transmitter remote from the first transmitter, the second transmitter, comprising:
  - a second receiver for receiving the data from the master transmitter;
  - a second time synchronization module for generating the globally common time reference independently of the data received by the second transmitter;
  - a second time offset generator for generating a first time offset between the synchronization information of the data received in the second transmitter and the generated globally common time reference;
  - a second delay module for generating second delayed data from the data received in the second transmitter and delayed by the second time offset;
  - a second carrier generator for generating a second carrier according to the generated globally common time reference;
  - a second modulator for modulating the second delayed data with the second carrier to produce a second signal; and
  - a second means for transmitting the second signal having the second delayed data by the second transmitter;
- wherein the first signal and second signal are transmitted to a receiver in a coverage area of the first transmitter and the second transmitter and the first carrier and the second carrier are synchronized to be in phase according to the globally common time reference.

12. The apparatus of claim 11, wherein at least one of the first time offset and the second time offset includes a causal delay.

13. The apparatus of claim 11, wherein the first time offset and the second time offset are predetermined.

14. The apparatus of claim 11, wherein the receiver is one of a plurality of receivers in the coverage area of the first transmitter and the second transmitter and the first time offset and the second time offset are selected to maximize a number of the plurality of receivers in the coverage area that can receive the data.

15. The apparatus of claim 11, wherein the globally common time reference is independent from a master transmitter transmitting the data to the first transmitter and the second transmitter.

16. The apparatus of claim 11, wherein the globally common time reference is comprised in a signal from a global positioning system (GPS) satellite.

17. The apparatus of claim 11, wherein the first signal and the second signal are vestigial advanced television systems committee (ATSC) compliant signals, and the synchronization information comprises a data segment synchronization signal.

18. The apparatus of claim 11, wherein synchronization information comprises a plurality of identical symbols inserted every N symbols.

19. The apparatus of claim 11, wherein the synchronizing information is selected from a data segment synchronization signal and a data field synchronization signal of an ATSC-compliant signal.

20. An apparatus for synchronizing a first signal comprising data transmitted by a first transmitter and a second signal comprising the data transmitted by a second transmitter remote from the first transmitter, the first signal and second signal transmitted to a receiver in a coverage area of the first transmitter and the second transmitter, wherein the data comprises a plurality of data frames, each of the plurality of data frames having synchronization information having a constant value among the data frames, comprising:
- means for receiving the data in the first transmitter from a master transmitter;
- means for receiving the data in the second transmitter from the master transmitter;
- means for generating a first time offset between the synchronization information of the data received in the first transmitter and a global time reference common to the first transmitter and the second transmitter and independent from the data received by the first transmitter;
- means for generating a second time offset between the synchronization information received in the second transmitter and the time reference common to the first transmitter and the second transmitter and independent from the data received by the second transmitter; and
- means for generating first delayed data from the data received in the first transmitter delayed by the first time offset;
- means for generating second delayed data from the data received in the second transmitter delayed by the second time offset;
- means for transmitting the first signal comprising the first delayed data from the first transmitter, comprising means for modulating the first delayed data with a first carrier at a first frequency; and
- means for transmitting the second signal comprising the second delayed data by the second transmitter, comprising means for modulating the second delayed data with a second carrier at the first frequency;
- wherein the first carrier and the second carrier are synchronized to be in phase according to the global time reference.

21. The apparatus of claim 20, wherein at least one of the first time offset and the second time offset includes a causal delay.

22. The apparatus of claim 20, wherein the first time offset and the second time offset are predetermined.

23. The apparatus of claim 20, wherein the receiver is one of a plurality of receivers in the coverage area of the first transmitter and the second transmitter and the first time offset and the second time offset are selected to maximize a number of the plurality of receivers in the coverage area that can receive the data.

24. The apparatus of claim 20, wherein the time reference is independent from a master transmitter transmitting the data to the first transmitter and the second transmitter.

25. The apparatus of claim 20, wherein the time reference is comprised in a signal from a global positioning system (GPS) satellite.

26. The apparatus of claim 20, wherein the first signal and the second signal are vestigial advanced television systems committee (ATSC) compliant signals, and the synchronization information comprises a data segment synchronization signal.

27. A system for synchronizing the transmission of data comprising a plurality of data frames, each of the plurality of data frames having synchronization information having a constant value among the data frames, comprising:
   a master transmitter, for transmitting the data;
   a first transmitter, comprising:
      a first receiver for receiving the data from the master transmitter;
      a first time synchronization module for generating a globally common time reference independently from the data received by the first transmitter;
      a first time offset generator for generating a first time offset between the synchronization information of the data received in the first transmitter and the generated globally common time reference;
      a first delay module for generating first delayed data from the data received in the first transmitter and delayed by the first time offset; and
      a first means for transmitting the first signal comprising the first delayed data from the first transmitter, comprising means for modulating the first delayed data with a first carrier at a first frequency;
   a second transmitter, comprising:
      a second receiver for receiving the data from the master transmitter;
      a second time synchronization module for generating the globally common time reference independently of the data received by the second transmitter;
      a second time offset generator for generating a first time offset between the synchronization information of the data received in the first transmitter and the generated globally common time reference;
      a second delay module for generating second delayed data from the data received in the second transmitter and delayed by the second time offset; and
      a second means for transmitting the second signal comprising the second delayed data by the second transmitter, comprising means for modulating the second delayed data with a second carrier at the first frequency;
   wherein the first signal and second signal transmitted to a receiver in a coverage area of the first transmitter and the second transmitter and the first carrier and the second carrier are synchronized to be in phase according to the global time reference.

28. The system of claim 27, wherein at least one of the first time offset and the second time offset includes a causal delay.

29. The system of claim 27, wherein the first time offset and the second time offset are predetermined.

30. The system of claim 27, wherein the receiver is one of a plurality of receivers in the coverage area of the first transmitter and the second transmitter and the first time offset and the second time offset are selected to maximize a number of the plurality of receivers in the coverage area that can receive the data.

31. The system of claim 27, wherein the time reference is independent from a master transmitter transmitting the data to the first transmitter and the second transmitter.

32. The system of claim 27, wherein the time reference is comprised in a signal from a global positioning system (GPS) satellite.

33. The system of claim 27, wherein the first signal and the second signal are vestigial advanced television systems committee (ATSC) compliant signals, and the synchronization information comprises a data segment synchronization signal.

* * * * *